(12) United States Patent
Hu

(10) Patent No.: US 7,110,598 B2
(45) Date of Patent: Sep. 19, 2006

(54) AUTOMATIC COLOR CONSTANCY FOR IMAGE SENSORS

(75) Inventor: Shane Ching-Feng Hu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 459 days.

(21) Appl. No.: 10/228,947

(22) Filed: Aug. 28, 2002

(65) Prior Publication Data

US 2004/0042653 A1 Mar. 4, 2004

(51) Int. Cl.
*G06K 9/00* (2006.01)
*G06F 13/00* (2006.01)

(52) U.S. Cl. ........................ 382/167; 345/604

(58) Field of Classification Search ............... 382/167, 382/254, 276, 162, 117; 358/1.9, 505, 509, 358/518, 520, 523, 530; 345/589, 600, 604, 345/617, 619, 690; 348/184, 229.1, 731; 356/406
See application file for complete search history.

(56) References Cited

U.S. PATENT DOCUMENTS

| | | | | |
|---|---|---|---|---|
| 5,712,659 A | * | 1/1998 | Adachi | 345/617 |
| 5,754,222 A | * | 5/1998 | Daly et al. | 348/184 |
| 6,028,608 A | * | 2/2000 | Jenkins | 345/619 |
| 6,697,128 B1 | * | 2/2004 | Sowig et al. | 348/731 |
| 6,707,573 B1 | * | 3/2004 | Ito et al. | 358/1.9 |
| 6,912,307 B1 | * | 6/2005 | Spitzer et al. | 382/167 |
| 2002/0180766 A1 | * | 12/2002 | Wada | 345/690 |
| 2003/0053062 A1 | * | 3/2003 | Lauinger | 356/406 |
| 2004/0042653 A1 | * | 3/2004 | Hu | 382/167 |

OTHER PUBLICATIONS

Kobus Barnard, et al. "A Comparison of Computational Color Constancy Algorithms; Part One: Methodology and Experiments with Synthesized Data".
Kobus Barnard, et al. "A Comparison of Computational Color Constancy Algorithms; Part Two: Methodology and Experiments with Synthesized Data".

* cited by examiner

*Primary Examiner*—Amir Alavi
(74) *Attorney, Agent, or Firm*—Dickstein Shapiro Morin & Oshinsky, LLP

(57) ABSTRACT

An electronic imaging system operates as closely as possible to the cone spectral response space to obtain a human eye-like long, medium, short (LMS) wavelength response. An input image, for example, red-green-blue (RGB), is transformed to an LMS color space similar to the human long-, middle-, and short-wavelength cone receptor responses. Adaptation levels for each LMS component are calculated. The adaptation levels are then used to adjust the sensitivity of each LMS sensor response to obtain an LMS component image. The LMS component image then is transformed back to an RGB component image for further processing or display.

31 Claims, 2 Drawing Sheets

AUTOMATIC COLOR CONSTANCY FOR IMAGE SENSORS

BACKGROUND OF THE INVENTION

1. Field of the Invention

The present invention relates to digital image sensors, and, more specifically, to a chromatic adaptation method for maintaining color constancy under different illuminations in a digital image sensor.

2. Brief Description of the Related Art

Color constancy is one of the characteristics of the human vision system. The color appearance of the same object looks approximately identical under vastly different types of natural and artificial light sources, such as sun light and moon light, and incandescent, fluorescent, and candle light. The ability of the human visual system to determine surface colors under this wide range of illumination conditions is called constancy. In electronic imaging systems, this is commonly implemented with limited success as an automatic white balance. Extensive research has been conducted into ways to achieve human eye-like color constancy in electronic image sensors. Nevertheless, present day white balance systems not only lack a response sufficiently similar to that of the human eye, they also achieve only a narrow subset of the overall needs of a true color constancy system.

One of the ways that the human visual system achieves constancy is referred to as adaptation, which can be understood as a change in gain of the signal from the cone receptors of the eye. The cone receptors become less sensitive because of chemical bleaching in the presence of increased light. This results in a reduction in sensitivity for those cones experiencing greater light intensities. If the light is strongly colored, then the different cone types will become differentially adapted. In red light, for example, long wavelength cones will become less sensitive. The effect of adaptation is to make the eye have a sensitivity range appropriate to the environment.

This theory of constancy in the human vision system generally holds that differences in the type of illumination are accommodated by the chromatic adaptation of the human vision system. The sensitivities of long (L), middle (M) and short (S) wavelength cones adapt to stimuli in a largely independent way. This is the hypothesis proposed by von Kries, although exact details of the adaptation were not provided. ("Chromatic Adaptation," J. von Kries, Festschrift der Albrecht-Ludwig-Universität, 1902).

Examples of some of the algorithms that have been explored for providing color constancy in electronic image sensors include: Gray World, Retinex, Gamut Mapping Methods, Color by Correlation, and Neural Net Methods. See "A Comparison of Computational Color Constancy Algorithms," Parts One and Two, by K. Barnard et al., available at http://www.cs.berkeley.edu/~kobus/research/publications/comparison{_1 or _2}/comparison{_1 or _2}.pdf.

Most electronic image sensors are designed with spectral responses that evenly divide the visible spectrum into color ranges, such as the three primary colors red, blue, and green, with little or no overlap between each range. The response represents the absolute photon acquisition experienced by each pixel of the digital image sensor, for example.

In contrast to the known electronic image sensors, the three types of color receptors in the human eye—long-, middle-, and short-wavelength cones (LMS)—have been found to exhibit significant overlap in spectral response. As a consequence of this overlapping spectral response, the hue-discrimination response of the human eye is highly non-linear, with peak sensitivity occurring near certain wavelengths. By comparison, an imaging array that utilizes an RGB filter, such as a Bayer filter, acts as a simplified band pass filter that does not correspond to the spectral response of the human eye.

Color standards are maintained by the Commission Internationale de L'Eclairage (CIE). The CIE has developed standard color systems based on the concept of a standard observer. The standard observer is based on a model of human rods and cones. The CIE system does not take adaptation into account, however. The CIE systems define color using tristimulus values X, Y, and Z. Y is the same as luminance (black and white).

It would be desirable to have an imaging system which more nearly replicates the color discrimination of the human eye to achieve more constancy in color reproduction under different lighting conditions.

BRIEF SUMMARY OF THE INVENTION

The present invention provides a method, apparatus, and stored program for an electronic imaging system to operate as close as possible to the cone spectral response space of the human eye. Accordingly, the present invention provides a chromatic adaptation method and system by which color constancy under different illuminations can be more closely maintained.

According to an exemplary embodiment of the present invention, an input image having an imager color space, for example, a red-green-blue (RGB) color space, is transformed to an LMS color space, a color space similar to the human long-, middle-, and short-wavelength cone receptor responses. Mean and maximum adaptation levels (signal strengths) for each LMS component are calculated. The adaptation levels are then used to equalize the sensitivity of each LMS sensor response to obtain an equalized LMS component image. This is equivalent to an automatic gain control for each individual LMS sensor output, and compensates for different types of illumination. The LMS component image is then converted back to a display device color space, e.g., an RGB image. The invention may be embodied as an algorithm executed in hardware, software, or a combination of the two.

The invention achieves significant color constancy behavior, and is straightforward and relatively easy to implement.

These and other features and advantages of the invention will be better understood from the following detailed description, which is provided in connection with the accompanying drawings.

DETAILED DESCRIPTION OF THE INVENTION

In the following description, an exemplary imager color space will be described as an RGB color space; however, the invention has applicability to other input device color spaces as well.

Figure 1:
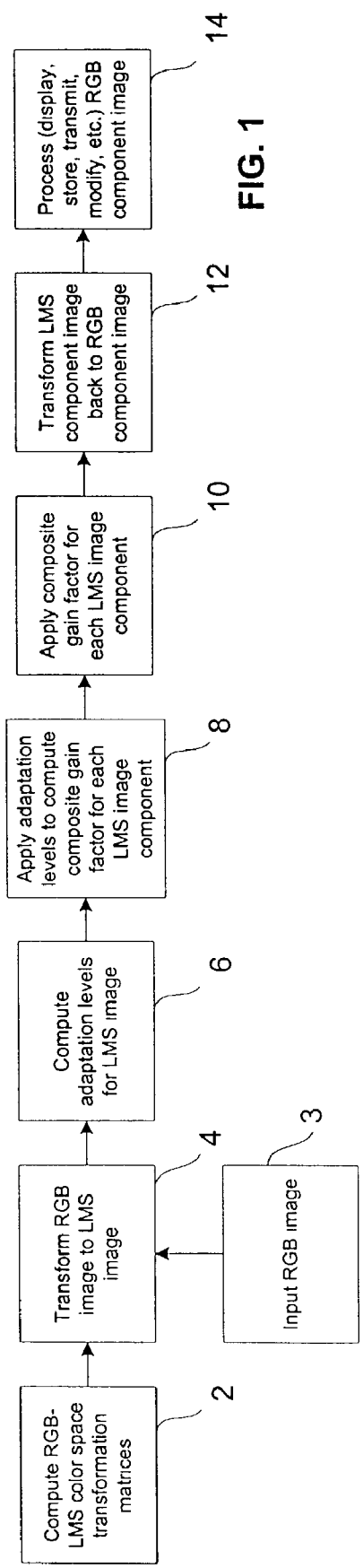
FIG. 1 is a flow chart illustrating a process for implementing color constancy system according to an exemplary embodiment of the present invention.

Referring to FIG. 1, image sensor data from an RGB color space is transformed to an LMS color space by the sequential steps of:

Setting up an RGB to LMS color space transformation matrix as shown in step 2;

transforming an inputted RGB component image to an LMS component image using the transformation matrix in steps 3 and 4;

computing an adaptation level (mean signal strength) and equalizing the sensitivity for each LMS component image in step 6;

computing a composite gain factor based on a maximum adaptation level (signal strength) for each LMS component image in step 8;

applying the composite gain factor for each LMS component image in step 10;

transforming the adjusted LMS component image back to an RGB component image in step 12; and displaying or otherwise outputting the RGB image in step 14.

The process sequence illustrated in FIG. 1 is described below in further detail in relation to an exemplary embodiment of the present invention. Referring first to step 2, based on the chromaticity of a targeted display monitor, a 3 by 3 transformation matrix can be derived to transform the image sensor data from RGB space to CIE tristimulus XYZ space. See "Fundamentals of Three Dimensional Computer Graphics" by Alan Watt, 1989 AddisonWesley, ISBN 0-201-154420, the disclosure of which is incorporated herein by reference. Because the CIE XYZ color-matching functions all represent a linear combination of cone (LMS) responses, the transformation from an XYZ color space to an LMS color space can also be defined by a 3 by 3 linear matrix. See "Color Appearance Models" by Mark D. Fairchild, 1997 Addison-Wesley, ISBN 0-201-63464-3, the disclosure of which is incorporated herein by reference. A composite RGB to LMS color space transformation matrix thus can be formed by concatenating the two 3 by 3 matrices. The resulting concatenated matrix is obtained by multiplication of the two 3 by 3 matrices.

The color space conversion process is applied to every normalized input RGB pixel to obtain the pixel values under LMS color space. For example, using an eight bit system, RGB intensity values will range from 0–255. These values are transformed into the LMS color space to have an intensity value from 0 (black) to 1 (saturated), for example, whereby a normalized value of input RGB pixels is used to divide each input RGB pixel value by the maximum permitted value.

Equation (1) is an exemplary transformation matrix for an RGB imaging device having an ITU-R709 (SMPTE 274M) chromaticity:

$$\begin{bmatrix} L \\ M \\ S \end{bmatrix} = \begin{bmatrix} 0.134 & 0.640 & 0.047 \\ 0.155 & 0.758 & 0.087 \\ -0.019 & 0.153 & 0.877 \end{bmatrix} \times \begin{bmatrix} R \\ G \\ B \end{bmatrix} \quad (1)$$

This transformation matrix is established in step 2 of FIG. 1, and is used in step 4 to transform input RGB pixel data obtained at step 3 in FIG. 1.

Once the input RGB image is converted to an LMS image in step 4, an adaptation model is determined for each of the L, M, and S components of the LMS color space. A central issue of any adaptation model is to find the appropriate adaptation level for each LMS component. According to an exemplary embodiment of the present invention, use is made of the root of a relatively high degree geometric mean. It provides a very robust measure of the adaptation level.

The high degree geometric mean for each L, M, and S component is obtained by initially calculating a geometric sum (gsum), as shown in equation (2), by summing each pixel intensity value pi raised to the power of K. K preferably is at least about 4, more preferably 5 or 6.

$$gsum = \sum_{i=1}^{N} pow(Pi, K) \quad (2)$$

Once the geometric sum for each component L, M, and S is calculated, the root mean for each component is determined as shown in equation (3), by averaging the result (gsum) of equation (2), and taking the Kth root of that average, as follows:

$$adapt-level = pow(gsum/N, 1.0/K) \quad (3)$$

In equations (2) and (3), Pi is the value of each LMS pixel i, where i varies from 1 to N, N being the total number of pixels for each LMS image component, and K is a power factor. Having K around at least 4 works quite well across wide spectrum of test images. The value of "adapt-level" is calculated independently for each LMS component (L_adapt-level, M_adapt-level, S_adapt-level).

After the adaptation model values L_adapt-level, M_adapt-level, S_adapt-level are calculated in step 6, they are used to compute a composite gain factor made up of a global gain factor, and individual component gain factors for each LMS image component. The composite gain factor is applied to each of the LMS components in step 10. The global and individual component gain factors are combined into the composite gain factor for efficient image processing pipeline implementation.

The global gain factor is related to the exposure time. It can be viewed as a form of automatic exposure control in a digital camera, and is common to all LMS components. The individual component gain factor is related to the chromatic adaptation. The two gain factors are independent from each other.

Figure 2:
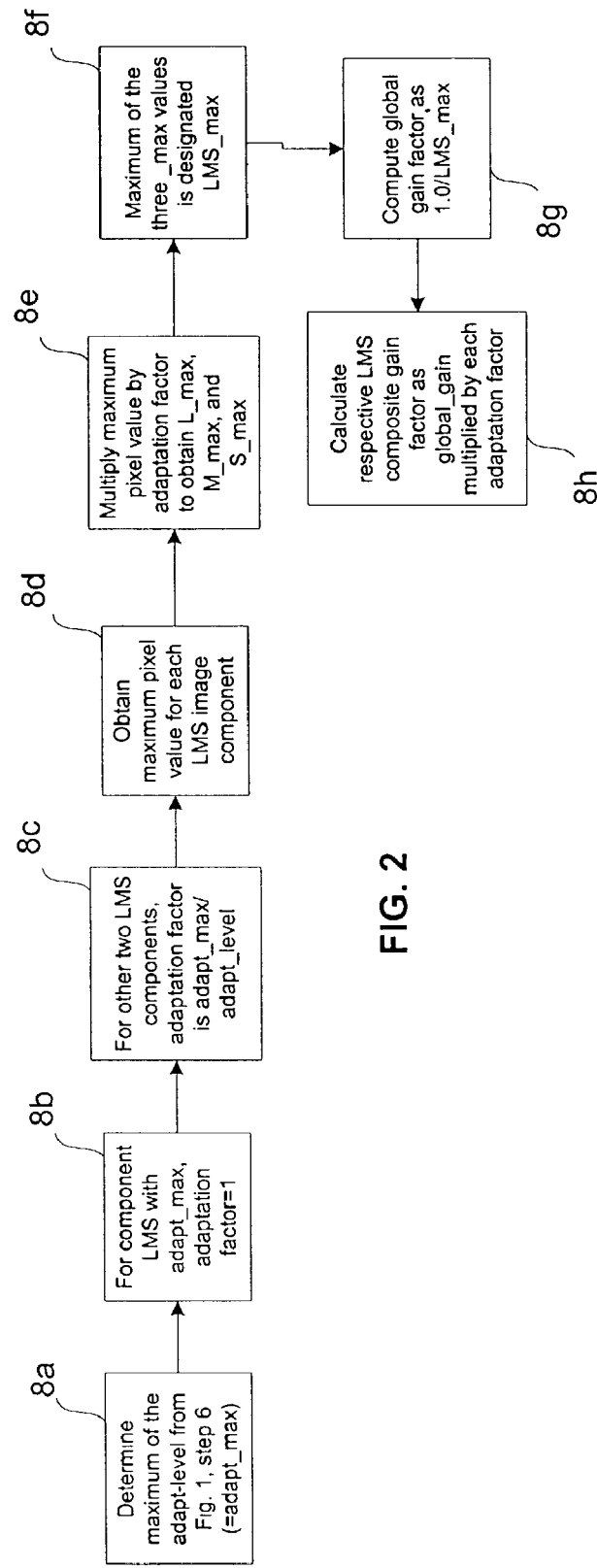
FIG. 2 is a flow chart illustrating in greater detail portions of the process illustrated in FIG. 1.

The composite gain factors are obtained by determining the correct gain balance between each of the L, M, and S components, based on maximum gain values, and determining the overall, global gain. More specifically, the composite gain factor for each LMS component is calculated as shown in FIG. 2 and described as follows:

Equalization factors "L-equalize", "M-equalize", and "S-equalize" are obtained in the following steps:

Using the results of the adaptation model (Equation 3 above), the maximum adapt-level value is determined from the three adapt-level values for the LMS components, as shown in step 8a of FIG. 2. This adapt value is denoted adapt_max. For the component L, M, or S with this maximum "adapt-level" value, the equalization factor equals one (step 8b).

For the two LMS components other than the one with maximum "adapt-level" value (adapt_max) the respective equalization factor L-equalize, M-equalize or S-equalize is related to adapt_max as adapt_max/(L, M, or S)-adapt_level. See step 8c of FIG. 2. The equalization factors will be used to balance the sensitivity of the three components. Consequently, pixels of the component having the highest intensity will remain at the same value, while pixels of the other components will have their intensities increased. For example, when an incandescent light source is being used, the light will have higher intensities in the L wavelengths, and the equalization factor for the L wavelengths will be one. Since intensity values range from 0 to 1, the other wavelength components—M and S—will have equalization factors greater than one. Accordingly, their sensitivities will be increased relative to the L wavelengths, thereby simulating the manner in which the human eye provides constancy.

A global gain control is obtained by first determining a maximum pixel value for each LMS image component in step 8d. These values are denoted as L_max, M_max, and S_max.

For each of the LMS components, the equalization factor is applied to the maximum pixel value to obtain equalized maxima, i.e., L_max_equalized equals L_max multiplied by the equalization factor "L_equalize" found in the previous steps, as shown in step 8e of FIG. 2.

The results of step 8e, are compared to obtain the maximum value of L_max_equalized, M_max_equalized, and S_max_equalized, which is denoted as LMS_max in step 8f. The global gain control is found in step 8g as global_gain=1.0/LMS_max.

The composite gain factor for each LMS component is calculated in step 8h by multiplying the global_gain to the adaptation factor of each component. For example, the composite gain for the L component is: L_gain=global_gain×L_adapt.

The global gain factor is combined with the component gain factor to provide a composite gain factor which is applied at step 10 of FIG. 1 to each LMS component image. For example, for each pixel in the L component image, the final pixel value is obtained by multiplying with "L_gain". Similarly, the final pixel value for each pixel in the M component image is multiplied by "M_gain" and the S component "S_gain."

The LMS image is then transformed to the RGB color space and scaled by the desired bit precision, into an 8-bit domain, for example, for integer representation by an inverse application of equation (1) above using matrix multiplication.

The invention provides an electronic imaging system that operates as closely as possible to the cone spectral response space to obtain a human eye-like response. The inventive algorithm is embodied in hardware or software and executes a chromatic adaptation by which color constancy under different illuminations is maintained. An input red-green-blue (RGB) image, for example, is transformed to an LMS color space similar to the human long-, middle-, and short-wavelength cone receptor responses. Adaptation levels for each LMS component are calculated, which are then used to adjust the sensitivity of each LMS sensor response to obtain an LMS component image. The LMS component image then is transformed back to an RGB component image for further processing or display.

Although the invention has been described mostly using images acquired in an additive, RGB color space, other color imaging protocols could be used in the present invention, including, for example, a subtractive CMY color space. Similarly, although the example of a transform matrix from RGB space to CIE tri-stimulus XYZ space was utilized, with a second linear transform from XYZ to LMS defined by a 3 by 3 linear matrix, the invention need not be limited to the particular calorimetric color spaces or types of transforms.

Figure 3:
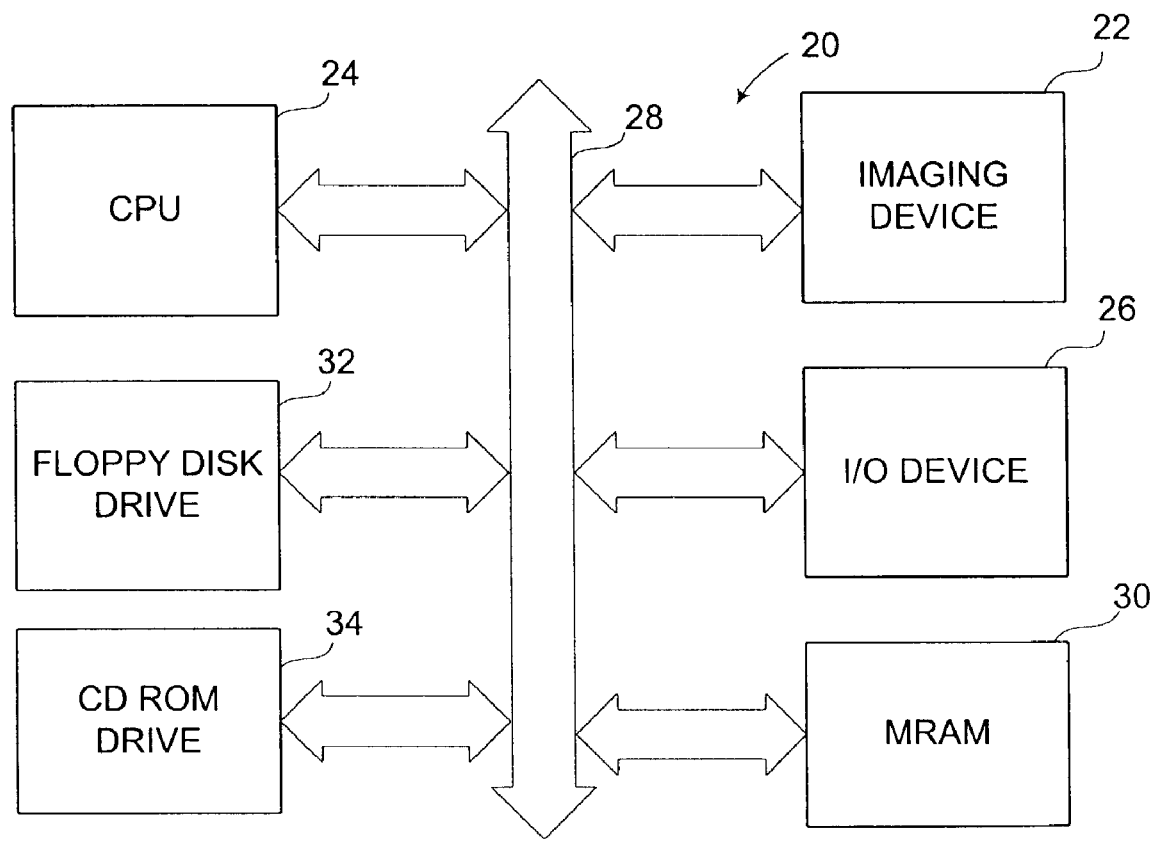
FIG. 3 illustrates a CMOS imaging system including circuitry for computing color constancy according to an exemplary embodiment of the present invention.

FIG. 3 illustrates a processor system 20 in which an imaging device 22 incorporating the color constancy methods according to the present invention is utilized. System 20 may be a stand alone system, or a system of individual, interconnectable components, each of the components incorporating one or more of the various subsystems illustrated in FIG. 3.

System 20 includes a CPU 24 and a user input/output (I/O) device 26 connected to a system bus 28. System 20 also includes MRAM 30. MRAM 30 communicates with the other components by way of system bus 28. Other optional peripheral devices include a disk drive 32 and a CD ROM drive 34. Additional optional peripheral devices could include removable memory storage devices for storing images obtained by the CMOS imager, such as memory cards, memory sticks, etc.

While preferred embodiments of the invention have been described and illustrated above, it should be understood that these are exemplary of the invention and are not to be considered as limiting. For example, although an exemplary embodiment has been described in connection with a CMOS image sensor, the invention is applicable to other electronic image sensors, such as CCD image sensors, for example. Additions, deletions, substitutions, and other modifications can be made without departing from the spirit or scope of the present invention. Accordingly, the invention is not to be considered as limited by the foregoing description but is only limited by the scope of the appended claims.

What is claimed as new and desired to be protected by Letters Patent of the United States is:

1. A method for improving color constancy under different illumination conditions, comprising:
    transforming an input image to an image in a color space corresponding to that of a human eye, the color space image having a plurality of components;
    calculating adaptation levels for each of the plurality of components;
    adjusting a sensitivity of each of the plurality of components based on the adaptation levels; and
    transforming the color space image to an output image.

2. A method as in claim 1, wherein the input image originates from an image sensor.

3. A method as in claim 1, wherein the input image originates from a digital image sensor.

4. A method as in claim 1, wherein the input image originates from a CMOS image sensor.

5. A method as in claim 1, wherein the input image is an RGB image.

6. A method as in claim 5, wherein the color space corresponding to that of a human eye is an LMS color space.

7. A method as in claim 5, wherein the input image is an RGB image which is transformed to an LMS color space.

8. A method as in claim 5, wherein the input image is an RGB image which is transformed using a transformation matrix representing the concatenation of an RGB to CIE tri-stimulus XYZ space transform and a CIE ti-stimulus XYZ space to LMS transform.

9. A method as in claim 5, wherein the adaptation levels are calculated for each LMS component.

10. A method as in claim 1, wherein the adaptation levels are calculated as root means of individual pixel intensity values.

11. A method as in claim 10, wherein the root means are calculated by obtaining a geometric sum of the pixel intensity values to the Kth power, and finding the Kth root of the geometric sum, as follows:

$$gsum = \sum_{i=1}^{N} pow(Pi, K)$$

$$adapt-level = pow(gsum/N, 1.0/K)$$

where Pi denotes a pixel intensity value for each of a plurality of pixels i, i ranging from 1 to N, with N being a total number of pixels, and K is a high degree power factor.

12. A method as in claim 11, wherein K is at least about 4.

13. A method as in claim 1, further comprising using the adaptation levels to calculate a composite gain factor for each LMS component, and using the composite gain to adjust the sensitivity of each of the plurality of components.

14. A method as in claim 13, wherein calculating the composite gain factors includes determining a maximum pixel value for each of the plurality of components to obtain a global gain value portion at the composite gain factors.

15. A method as in claim 14, wherein calculating the composite gain factors further includes assigning an adaptation factor of one to the component with the highest maximum value.

16. A method for improving color constancy under different illumination conditions, comprising:
computing a color space transformation matrix;
transforming an input image to a transformed image having plural components using the color space transformation matrix;
computing adaptation levels for the transformed image;
computing a composite gain factor based on the adaptation levels;
applying the composite gain factor to the transformed image to obtain an modified transformed image; and
transforming the modified transformed image to an output image; and processing the output image.

17. A method as recited in claim 16, wherein the color space input image is an RGB color space image, and the transformed image has a color space similar to that of the human eye.

18. A method as recited in claim 16, wherein the composite gain factor includes a global gain factor and an individual component gain factor for each of the plurality of components.

19. A method as recited in claim 16, where the output image is an RGB image, and the step of transforming the transformed image to an output image comprises multiplying the modified transformed image using an inverse of the transformation matrix.

20. A method as recited in claim 16, wherein the step of applying adaptation levels to compute a composite gain factor comprises: determining a maximum of the adaptation levels; obtaining adaptation factors for each of the plurality of components; obtaining maximum pixel intensity values for each of the plurality of components; multiplying the maximum pixel values by the respective adaptation values and selecting a maximum result; computing a global gain factor based on the maximum result; and calculating the composite gain factor as a product of the global gain factor and the respective adaptation factor.

21. An imaging device having improved color constancy under different illumination conditions, comprising:
computing elements for obtaining a color space transformation matrix;
transforming an input image to a transformed image having plural components using the color space transformation matrix;
computing adaptation levels for the transformed image;
computing a composite gain factor based on the adaptation levels;
applying the composite gain factor to the transformed image to obtain an modified transformed image;
transforming the modified transformed image to an output image; and
processing elements for processing the output image.

22. An imaging device as in claim 21, wherein the color space input image is an RGB color space image, and the transformed image has a color space similar to that of the human eye.

23. An imaging device as in claim 21, wherein the composite gain factor includes a global gain factor and an individual component gain factor for each of the plurality of components.

24. An imaging device as in claim 21, where the output image is an RGB image, and transforming the transformed image to an output image comprises multiplying the modified transformed image using an inverse of the transformation matrix.

25. An imaging device as in claim 21, wherein applying adaptation levels to compute a composite gain factor comprises: determining a maximum of the adaptation levels; obtaining adaptation factors for each of the plurality of components; obtaining maximum pixel intensity values for each of the plurality of components; multiplying the maximum pixel values by the respective adaptation values and selecting a maximum result; computing a global gain factor based on the maximum result; and calculating the composite gain factor as a product of the global gain factor and the respective adaptation factor.

26. An imaging device as in claim 21, wherein the image device comprises a CMOS imager.

27. A computer-readable storage medium containing a program for improving color constancy under different illumination conditions, the program comprising:
computer instructions for computing a color space transformation matrix;
transforming an input image to a transformed image having plural components using the color space transformation matrix;
computing adaptation levels for the transformed image;
computing a composite gain factor based on the adaptation levels;
applying the composite gain factor to the transformed image to obtain a modified transformed image; and
transforming the modified transformed image to an output image.

28. A computer readable storage medium as in claim 27, wherein the color space input image is an RGB color space image, and the transformed image has a color space similar to that of the human eye.

29. A computer-readable storage medium as in claim 27, wherein the composite gain factor includes a global gain factor and an individual component gain factor for each of the plurality of components.

30. A computer-readable storage medium as in claim 27, where the output image is an RGB image, and the step of transforming the transformed image to an output image comprises multiplying the modified transformed image using an inverse of the transformation matrix.

31. A computer-readable storage medium as in claim 27, wherein the step of applying adaptation levels to compute a composite gain factor comprises: determining a maximum of the adaptation levels; obtaining adaptation factors for each of the plurality of components; obtaining maximum pixel intensity values for each of the plurality of components; multiplying the maximum pixel values by the respective adaptation values and selecting a maximum result; computing a global gain factor based on the maximum result; and calculating the composite gain factor as a product of the global gain factor and the respective adaptation factor.

* * * * *

UNITED STATES PATENT AND TRADEMARK OFFICE
CERTIFICATE OF CORRECTION

| | |
|---|---|
| PATENT NO. | : 7,110,598 B2 |
| APPLICATION NO. | : 10/228947 |
| DATED | : September 19, 2006 |
| INVENTOR(S) | : Shane C. Hu |

It is certified that error appears in the above-identified patent and that said Letters Patent is hereby corrected as shown below:

Column 2, lines 59-60, "implementing color" should read --implementing a color--.

In the Claims:

Claim 16, column 7, line 45, "an modified" should read --a modified--; and

Claim 21, column 8, line 17, "an modified" should read --a modified--.

Signed and Sealed this

Nineteenth Day of December, 2006

JON W. DUDAS
*Director of the United States Patent and Trademark Office*